(12) United States Patent
Yan et al.

(10) Patent No.: US 11,675,448 B2
(45) Date of Patent: Jun. 13, 2023

(54) TOUCH PANEL AND METHOD FOR FORMING THE SAME

(71) Applicant: TPK Advanced Solutions Inc., Fujian (CN)

(72) Inventors: Chi-Mei Yan, Xiamen (CN); Jin-Hui Zhang, Xiamen (CN); Fang Fang, Xiamen (CN); Kang-Yu Liu, Hsinchu County (TW)

(73) Assignee: TPK Advanced Solutions Inc., Fujian (CN)

( * ) Notice: Subject to any disclaimer, the term of this patent is extended or adjusted under 35 U.S.C. 154(b) by 203 days.

(21) Appl. No.: 17/119,116

(22) Filed: Dec. 11, 2020

(65) Prior Publication Data

US 2022/0187932 A1   Jun. 16, 2022

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC ....................... G06F 3/041; G06F 2203/04103
See application file for complete search history.

(56) References Cited

U.S. PATENT DOCUMENTS

| | | | | |
|---|---|---|---|---|
| 2002/0086137 A1* | 7/2002 | Brouillette | ........... | B23K 26/364 |
| | | | | 257/E21.599 |
| 2012/0298497 A1* | 11/2012 | Maeda | ................. | C09J 133/066 |
| | | | | 200/600 |
| 2013/0100039 A1* | 4/2013 | Hong | ...................... | G06F 3/041 |
| | | | | 156/60 |
| 2014/0306941 A1* | 10/2014 | Kim | ...................... | G06F 1/1652 |
| | | | | 345/204 |
| 2015/0220183 A1 | 8/2015 | Youngs et al. | | |
| 2016/0187692 A1* | 6/2016 | Woo | ................... | G02F 1/133345 |
| | | | | 438/151 |
| 2016/0299609 A1* | 10/2016 | Sugitani | ................... | H05K 3/06 |
| 2019/0043927 A1* | 2/2019 | Jang | ..................... | H01L 27/323 |
| 2020/0301557 A1* | 9/2020 | Hsiao | ................... | G06F 3/04164 |
| 2021/0041986 A1* | 2/2021 | Hsiao | ................... | G06F 3/04164 |

(Continued)

FOREIGN PATENT DOCUMENTS

| | | |
|---|---|---|
| JP | 2010160670 A | 7/2010 |
| JP | 2016157442 A | 9/2016 |
| JP | 2019036016 A | 3/2019 |

(Continued)

*Primary Examiner* — Temesghen Ghebretinsae
*Assistant Examiner* — Sosina Abebe
(74) *Attorney, Agent, or Firm* — Cooper Legal Group, LLC (57) ABSTRACT

A touch panel having a visible area and a non-visible area disposed at least on one side of the visible area. The touch panel includes a substrate, a nano-metal conductive layer, a trace layer, a first passivation layer, and a second passivation layer. The nano-metal conductive layer is disposed on the substrate and at least in the visible area. The trace layer is disposed on the substrate and in the non-visible area. The trace layer is electrically connected to the nano-metal conductive layer. The first passivation layer covers the trace layer. The second passivation layer covers at least a portion of the first passivation layer. The first passivation layer has a different Young's modulus than the second passivation layer.

16 Claims, 6 Drawing Sheets

(56) References Cited

U.S. PATENT DOCUMENTS

2021/0091034 A1* 3/2021 Wang .................... H01L 23/291

FOREIGN PATENT DOCUMENTS

| JP | 2019144681 A | 8/2019 |
| KR | 202001131747 A | 10/2020 |
| TW | 201610769 A | 3/2016 |
| WO | 2013099776 A1 | 7/2013 |

* cited by examiner

TOUCH PANEL AND METHOD FOR FORMING THE SAME

BACKGROUND

Field of the Disclosure

The present disclosure relates to touch panel technology, and in particular the present disclosure relates to a flexible touch panel and a manufacturing method thereof.

Description of the Related Art

Touch panels have the characteristic of simple operation, and as such touch panels are easy to use. Touch panels are now widely used in various electronic products, such as smartphones, tablet computers, and so on. With the popularity of wearable electronic devices, the demand for flexible touch panels that can bent and folded has gradually increased.

In order to improve reliability and prevent environmental damage, a passivation layer is usually added to an existing touch panel. However, the design of the passivation layer often compromises the flexibility (bending ability) of the touch panel. Therefore, it is desirable to provide a touch panel with both bending ability and good reliability.

BRIEF SUMMARY

In accordance with some embodiments of the present disclosure, a double-layer passivation layer is provided on a trace layer in a touch panel, wherein the double-layer passivation layer includes a soft passivation layer with a Young's modulus less than 1 GPa and a hard passivation layer with a Young's modulus between 2 GPa and 4 GPa in order to improve the bending ability and anti-oxidation ability of the trace layer.

In accordance with some embodiments of the present disclosure, a touch panel having a visible area and a non-visible area disposed at least on one side of the visible area is provided, including: a substrate; a nano-metal conductive layer disposed on the substrate and at least in the visible area; a trace layer disposed on the substrate and in the non-visible area, wherein the trace layer is electrically connected to the nano-metal conductive layer; a first passivation layer covering the trace layer; and a second passivation layer covering at least a portion of the first passivation layer, wherein the first passivation layer has a different Young's modulus than the second passivation layer.

In accordance with some embodiments of the present disclosure, the first passivation layer is only disposed in the non-visible area and is directly disposed on the trace layer, and the second passivation layer is disposed in the visible area and the non-visible area.

In accordance with some embodiments of the present disclosure, the first passivation layer is disposed in the visible area and the non-visible area and is directly disposed on the trace layer in the non-visible area, and the second passivation layer is only disposed in the non-visible area.

In accordance with some embodiments of the present disclosure, the first passivation layer is disposed in the visible area and the non-visible area and is directly disposed on the trace layer in the non-visible area, and the second passivation layer is disposed in the visible area and the non-visible area.

In accordance with some embodiments of the present disclosure, the first passivation layer has a Young's modulus less than 1 GPa, and the second passivation layer has a Young's modulus between 2 GPa and 4 GPa; or the first passivation layer has a Young's modulus between 2 GPa and 4 GPa, and the second passivation layer has a Young's modulus less than 1 GPa.

In accordance with some embodiments of the present disclosure, each of the first passivation layer and the second passivation layer has a thickness than 10 μm.

In accordance with some embodiments of the present disclosure, each of the first passivation layer and the second passivation layer includes an acrylic resin, epoxy, polyamide, or a combination thereof.

In accordance with some embodiments of the present disclosure, a method for manufacturing a touch panel having a visible area and a non-visible area disposed at least on one side of the visible area is provided, including: forming a nano-metal conductive layer on a substrate; forming a trace layer on the substrate and in the non-visible area; forming a first passivation layer to cover the trace layer; and forming a second passivation layer on the first passivation layer and covering at least a portion of the first passivation layer, wherein the first passivation layer has a different Young's modulus than the second passivation layer.

In accordance with some embodiments of the present disclosure, each of forming the first passivation layer and forming the second passivation layer includes printing, slit coating, spraying, inkjet printing, or a combination thereof.

In accordance with some embodiments of the present disclosure, the trace layer is formed after the nano-metal conductive layer is formed.

In accordance with some embodiments of the present disclosure, the trace layer is formed before the nano-metal conductive layer is formed.

In accordance with some embodiments of the present disclosure, the first passivation layer is only formed in the non-visible area and is directly formed on the trace layer, and the second passivation layer is formed in the visible area and the non-visible area.

In accordance with some embodiments of the present disclosure, the first passivation layer is formed in the visible area and the non-visible area and is directly formed on the trace layer in the non-visible area, and the second passivation layer is only formed in the non-visible area.

In accordance with some embodiments of the present disclosure, the first passivation layer is formed in the visible area and the non-visible area and is directly formed on the trace layer in the non-visible area, and the second passivation layer is formed in the visible area and the non-visible area.

The touch panel of the embodiments of the present disclosure may be applied to the field of various types of touch devices. In order to make the above-mentioned objects, features, and advantages of the present disclosure more obvious and understandable, several embodiments are listed below and a detailed description is given with reference to the accompanying drawings.

BRIEF DESCRIPTION OF THE DRAWINGS

A detailed description is given in the following embodiments with reference to the accompanying drawings. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms "about" and "approximately" as used herein indicate the value of a given quantity that varies within 20% of the value, preferably 10% of the value, more preferably 5%, 3%, 2%, 1%, or 0.5% of the value. It is noted that, the quantity provided in the specification is an approximate quantity, that is, if there is no specific description of "about" or "approximately", "about" and "approximately" can still be implied.

Figure 1:
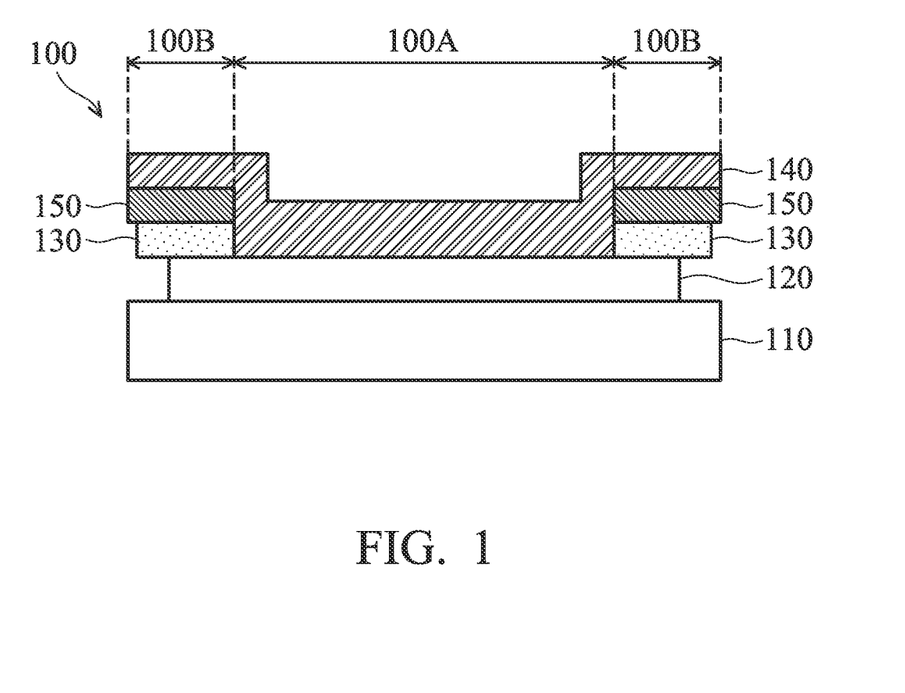
FIG. 1 shows a cross-sectional view of an exemplary touch panel, in accordance with a first embodiment of the present disclosure.

The present disclosure provides a double-layer passivation layer structure combining a soft passivation layer with a hard passivation layer in order to improve the ability to block the penetration of moisture and oxygen and to improve the bending ability of the touch panel at the same time. Refer to FIG. 1, which illustrates a cross-sectional view of the touch panel 100, in accordance with the first embodiment of the present disclosure. The touch panel 100 of the embodiment of the present disclosure includes a substrate 110, a nano-metal conductive layer 120, a trace layer 130, a hard passivation layer 140, and a soft passivation layer 150.

In some embodiments, the touch panel 100 includes a visible area 100A and a non-visible area 100B. The non-visible area 100B is usually located on at least one side of the visible area 100A, such as surrounding the visible area 100A, being located on opposite sides of the visible area 100A, or only being on one side of the visible area 100A. Although the range of the visible area 100A and the non-visible area 100B are drawn with dotted lines in FIG. 1, the range is only illustrative, and the embodiment of the present disclosure is not limited thereto. For example, the non-visible area 100B may not be aligned with the trace layer 130, but may extend toward the center of the substrate 110.

As shown in FIG. 1, in the touch panel 100, the nano-metal conductive layer 120 is disposed above the substrate 110. In some embodiments, the nano-metal conductive layer 120 is disposed in the visible area 100A and extends into the non-visible area 100B. In addition, in some embodiments, the nano-metal conductive layer 120 may form a plurality of nano-metal conductive electrodes (not shown) insulated from each other by a patterning process to sense a touch position.

The trace layer 130 is disposed above the substrate 110 and located in the non-visible area 100B, and the trace layer 130 is used to electrically connect to the nano-metal conductive layer 120. More specifically, the trace layer 130 may form a plurality of peripheral lead wires (not shown) that are insulated from each other by a patterning process, and each peripheral lead wire is electrically connected to one of the nano-metal conductive electrodes mentioned above in order to transmit a touch signal sensed by the nano-metal conductive electrode to a processing unit (not shown).

In some embodiments, the soft passivation layer 150 is only disposed in the non-visible area 100B and is directly disposed on the trace layer 130 to cover the trace layer 130. The hard passivation layer 140 is disposed in the visible area 100A and the non-visible area 100B. The hard passivation layer 140 is disposed on the soft passivation layer 150 in the non-visible area 100B to cover the soft passivation layer 150, and the hard passivation layer 140 is disposed on the nano-metal conductive layer 120 in the visible area 100A to cover the nano-metal conductive layer 120. The soft passivation layer 150 and the hard passivation layer 140 are passivation layers with different Young's moduli, which will be described in detail below.

In some embodiments, the material of the substrate 110 includes a flexible, transparent substrate, such as polyimide (PI), polyethylene terephthalate (PET), polycarbonate (PC), poly(methyl methacrylate) (PMMA), cyclic olefin copolymer (COP), the like, or a combination thereof.

In some embodiments, the nano-metal conductive layer 120 includes a metal nanowire layer, which may be a silver nanowire (SNW) layer, and may further include an overcoat (OC) in order to improve the durability of the metal nanowire layer. In some embodiments, the nano-metal conductive layer 120 may be deposited on the substrate by processes such as screen coating, printing, lamination, roll-to-roll, or the like. Subsequently, processes such as lithography and etching processes may be used to pattern the nano-metal conductive layer 120.

In some embodiments, the peripheral lead wires of the trace layer 130 may be metal traces, which include copper-nickel (CuNi), copper (Cu), silver (Ag), silver-palladium-copper alloy (Ag Palladium Cu, APC), the like, or a combination thereof. In some embodiments, the trace layer 130 may be formed after the nano-metal conductive layer 120 is formed. In an alternative embodiment, the trace layer 130 may be formed before the nano-metal conductive layer 120 is formed.

In some embodiments, the soft passivation layer 150 has a Young's modulus less than 1 GPa, such as between 0.5 and 1 GPa, and the hard passivation layer 140 has a Young's modulus between 2 GPa and 4 GPa, such as between 2 GPa and 3 GPa. In some embodiments, the materials of the soft passivation layer 150 and the hard passivation layer 140 may each include an acrylic, an epoxy resin, polyamide (PA), or a combination thereof. The materials of the soft passivation layer 150 and the hard passivation layer 140 are not limited thereto, as long as the materials meet the Young's moduli mentioned above. The soft passivation layer 150 and the hard passivation layer 140 may be different materials, or the same or similar materials with different Young's moduli. The soft passivation layer 150 and the hard passivation layer 140 may be formed by printing, slit coating, spraying, or inkjet printing processes.

In some embodiments, the thickness of the soft passivation layer 150 is less than 10 μm, such as between 3 and 10 μm, and the thickness of the hard passivation layer 140 is less than 10 μm, such as between 2 and 5 μm. In some embodiments, the thickness of the double-layer passivation layer that includes (or consists of) the soft passivation layer 150 and the hard passivation layer 140 is within the range of 5 to 20 μm, such as between 5 and 10 μm. If the thickness of the double-layer passivation layer exceeds 20 μm, the bending ability and effect of the touch panel 100 may be affected due to the excessive thickness.

In the present disclosure, the soft passivation layer 150 with better flexibility is configured to combine with the hard passivation layer 140 with better compactness in order to improve the ability to block moisture and oxygen from penetrating and to improve the bending ability of the touch panel 100. Specifically, in the non-visible area 100B, the bending ability and anti-oxidation ability of the trace layer 130 may be improved at the same time by disposing a double-layer passivation layer that includes a soft passivation layer 150 and a hard passivation layer 140 above the trace layer 130. In addition, the anti-oxidation ability of the nano-metal conductive layer 120 located in the visible area 100A is improved due to the overlying hard passivation layer 140.

Figure 2:
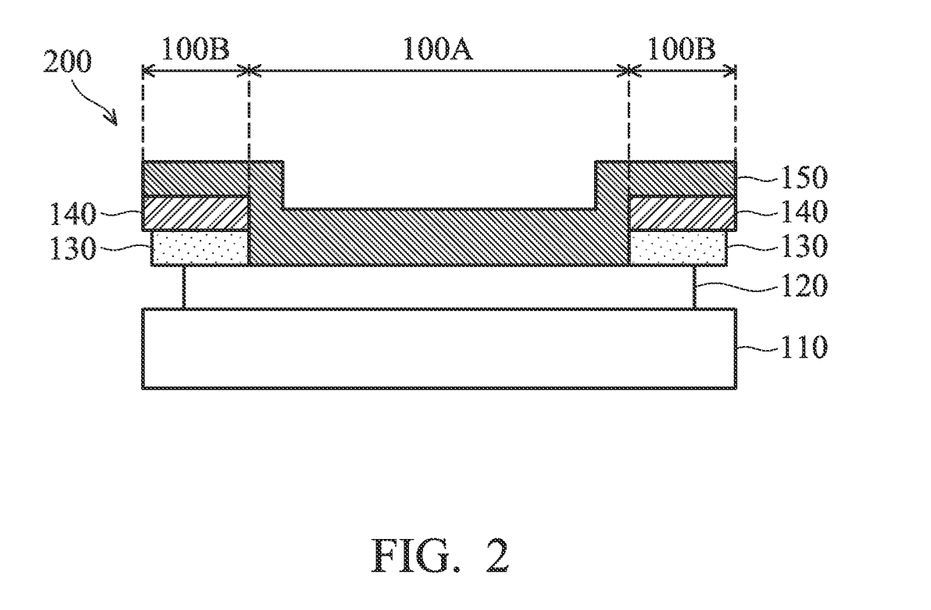
FIG. 2 shows a cross-sectional view of an exemplary touch panel, in accordance with a second embodiment of the present disclosure.

Refer to FIG. 2, which illustrates a cross-sectional view of the touch panel 200, in accordance with the second embodiment of the present disclosure. The structural difference between the touch panel 200 and the touch panel 100 of the first embodiment is that the configurations of the hard passivation layer 140 and the soft passivation layer 150 are exchanged. That is, in the touch panel 200, the hard passivation layer 140 is only disposed in the non-visible area 100B and is directly disposed on the trace layer 130 to cover the trace layer 130. The soft passivation layer 150 is disposed in the visible area 100A and the non-visible area 100B. In the non-visible area 100B, the soft passivation layer 150 is disposed on the hard passivation layer 140 to cover the hard passivation layer 140, and in the visible area 100A, the soft passivation layer 150 is disposed on the nano-metal conductive layer 120 to cover the nano-metal conductive layer 120.

In the non-visible area 100B of the touch panel 200, the bending ability and anti-oxidation ability of the trace layer 130 may be improved at the same time by disposing a double-layer passivation layer that includes a soft passivation layer 150 and a hard passivation layer 140 above the trace layer 130. In addition, the bending ability of the nano-metal conductive layer 120 located in the visible area 100A is improved due to the overlying soft passivation layer 150.

Figure 3:
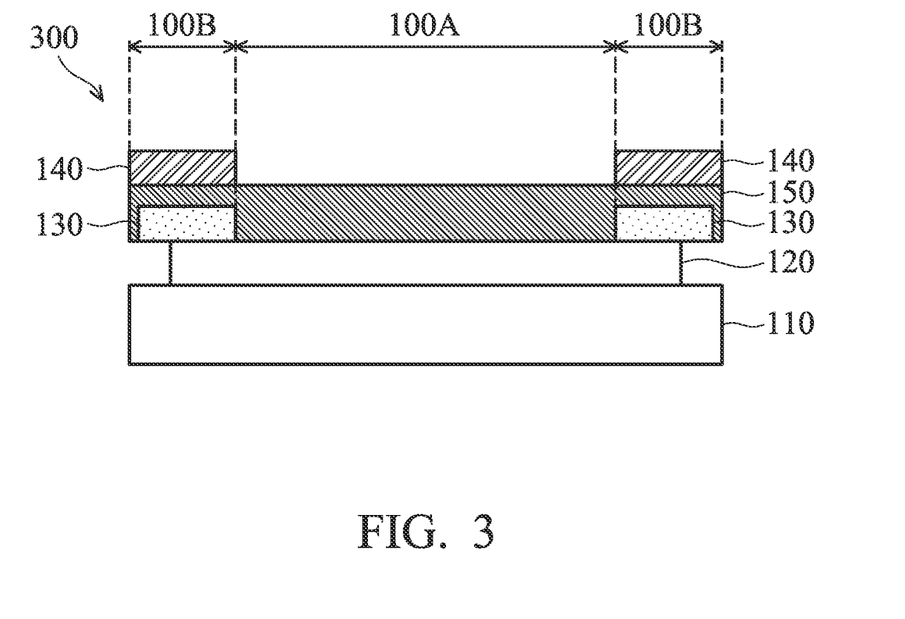
FIG. 3 shows a cross-sectional view of an exemplary touch panel, in accordance with a third embodiment of the present disclosure.

Refer to FIG. 3, which illustrates a cross-sectional view of a touch panel 300, in accordance with a third embodiment of the present disclosure. The structural difference between the touch panel 300 and the touch panel 100 of the first embodiment is that, in the touch panel 300, the soft passivation layer 150 is not only disposed in the non-visible area 100B but also extends into the visible area 100A, such that as the overall structure, the soft passivation layer 150 is directly disposed on the trace layer 130 in the non-visible area 100B to cover the trace layer 130 and is disposed on the nano-metal conductive layer 120 in the visible area 100A to cover the nano-metal conductive layer 120. On the contrary, the hard passivation layer 140 is only correspondingly disposed on the soft passivation layer 150 in the non-visible area 100B.

In the non-visible area 100B of the touch panel 300, the bending ability and anti-oxidation ability of the trace layer 130 may be improved at the same time by providing a double-layer passivation layer that includes a soft passivation layer 150 and a hard passivation layer 140 above the trace layer 130. In addition, the bending ability of the nano-metal conductive layer 120 in the visible area 100A is also improved due to the overlying soft passivation layer 150.

Figure 4:
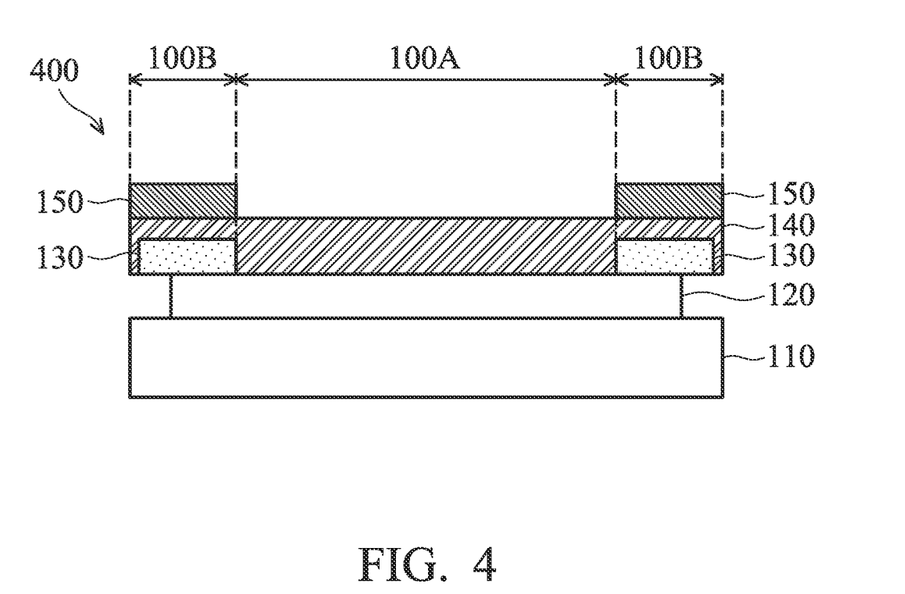
FIG. 4 shows a cross-sectional view of an exemplary touch panel, in accordance with a fourth embodiment of the present disclosure.

Refer to FIG. 4, which illustrates a cross-sectional view of a touch panel 400, in accordance with a fourth embodiment of the present disclosure. The structural difference between the touch panel 400 and the touch panel 300 of the third embodiment is that the configurations of the hard passivation layer 140 and the soft passivation layer 150 are exchanged. Specifically, in the touch panel 400, the hard passivation layer 140 is not only disposed in the non-visible area 100B but also extends to the visible area 100A, such that as the overall structure, in the non-visible area 100B, the hard passivation layer 140 is directly disposed on the trace layer 130 to cover the trace layer 130, and in the visible area 100A, the hard passivation layer 140 is disposed on the nano-metal conductive layer 120 to cover the nano-metal conductive layer 120. On the contrary, the soft passivation layer 150 is only correspondingly disposed on the hard passivation layer 140 in the non-visible area 100B.

In the non-visible area 100B of the touch panel 400, the bending ability and the anti-oxidation ability of the trace layer 130 may be improved at the same time by disposing a double-layer passivation layer that includes a soft passivation layer 150 and a hard passivation layer 140 above the trace layer 130. In addition, the anti-oxidation ability of the nano-metal conductive layer 120 in the visible area 100A is also improved due to the overlying hard passivation layer 140.

Figure 5:
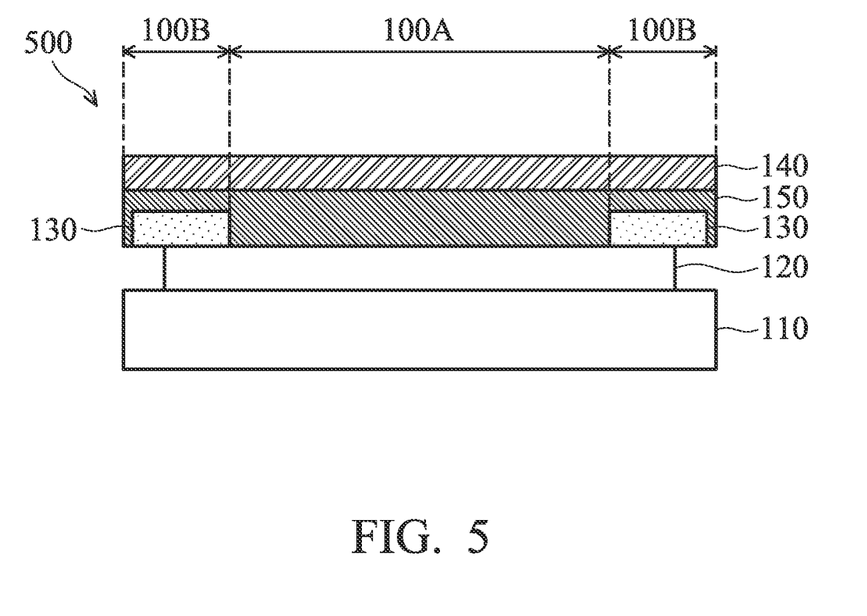
FIG. 5 shows a cross-sectional view of an exemplary touch panel, in accordance with a fifth embodiment of the present disclosure.

Refer to FIG. 5, which illustrates a cross-sectional view of a touch panel 500, in accordance with a fifth embodiment of the present disclosure. The structural difference between the touch panel 500 and the touch panel 300 of the third embodiment is that the hard passivation layer 140 is not only disposed in the non-visible area 100B but also extends to the visible area 100A, such that the hard passivation layer 140 is disposed on the soft passivation layer 150 in order to completely cover the soft passivation layer 150. That is, in the touch panel 500, the soft passivation layer 150 is directly disposed on the trace layer 130 and the nano-metal conductive layer 120, and the hard passivation layer 140 is disposed on the soft passivation layer 150, in order to cover the soft passivation layer 150 and the hard passivation layer 140 which are two completely stacked layers, on the trace layer 130 and the nano-metal conductive layer 120.

In the touch panel 500, the bending ability and the anti-oxidation ability of the trace layer 130 and the nano-metal conductive layer 120 may be improved at the same time by disposing a double-layer passivation layer that includes a soft passivation layer 150 and a hard passivation layer 140 above the trace layer 130 and the nano-metal conductive layer 120.

Figure 6:
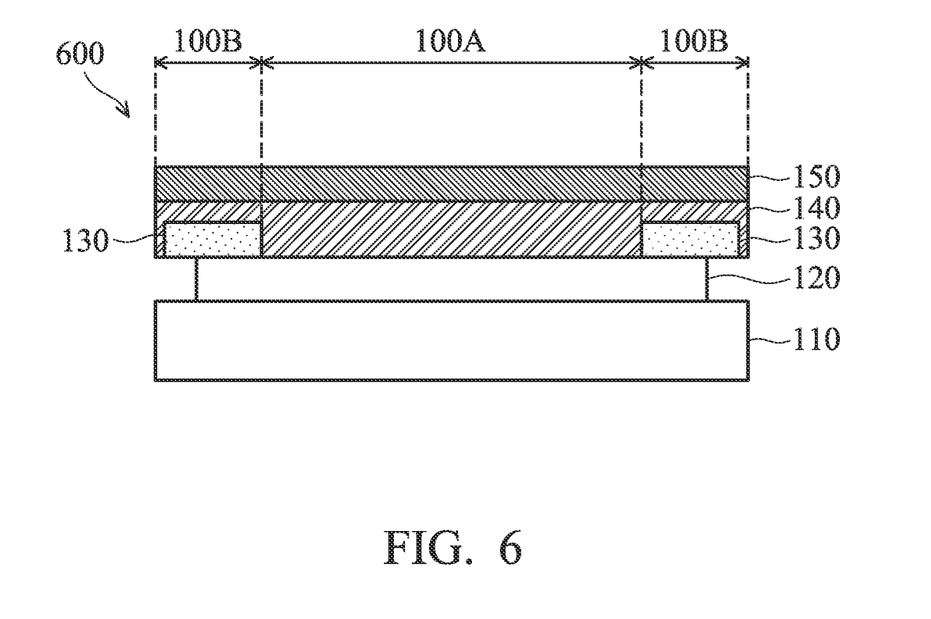
FIG. 6 shows a cross-sectional view of an exemplary touch panel, in accordance with a sixth embodiment of the present disclosure.

Refer to FIG. 6, which illustrates a cross-sectional view of a touch panel 600, in accordance with a sixth embodiment of the present disclosure. The structural difference between the touch panel 600 and the touch panel 500 of the fifth embodiment is that the configurations of the hard passivation layer 140 and the soft passivation layer 150 are exchanged. That is, in the touch panel 600, the hard passivation layer 140 is disposed in the non-visible area 100B and the visible area 100A in order to be directly disposed on the trace layer 130 and the nano-metal conductive layer 120, and the soft passivation layer 150 is disposed in the non-visible area 100B and the visible area 100A in order to be disposed on the hard passivation layer 140 and completely cover the hard passivation layer 140.

In the touch panel 600, the bending ability and the anti-oxidation ability of the trace layer 130 and the nano-metal conductive layer 120 may be improved at the same time by providing a double-layer passivation layer that includes a soft passivation layer 150 and a hard passivation layer 140 above the trace layer 130 and the nano-metal conductive layer 120.

In order to evaluate the protective ability of the double-layer passivation layer of the embodiments of the present disclosure on the nano-metal conductive layer, a high-temperature and high-humidity (HTHH) test was performed on the structure including the nano-metal conductive layer and the passivation layer, wherein the test temperature was 85° C. and humidity was 85%, and the sheet resistance variation rate of the nano-metal conductive layer was calculated. The test results are shown in Table 1 below. Structures including a single-layer soft passivation layer, a single-layer hard passivation layer, and a double-layer passivation layer including a soft passivation layer and a hard passivation layer were tested respectively.

TABLE 1

| Test conditions HTHH: 85° C., 85% | | | |
|---|---|---|---|
| Passivation layer | | | |
| hard passivation layer | soft passivation layer | hard passivation layer + soft passivation layer | soft passivation layer + hard passivation layer |
| Structure | | | |
| hard passivation layer/nano-metal conductive layer/substrate | soft passivation layer/nano-metal conductive layer/substrate | soft passivation layer/hard passivation layer/nano-metal conductive layer/substrate | hard passivation layer/soft passivation layer/nano-metal conductive layer/substrate |
| 120 h | 0.6% | 11.2% | 2.1% | 2.9% |
| 240 h | 4.5% | 15.5% | 2.1% | 2.4% |
| 360 h | 7.2% | 24.9% | 5.7% | 4.0% |
| 500 h | 8.4% | 44.5% | 8.0% | 7.2% |

According to the data tabulated in Table 1, under the conditions of high temperature and high humidity, a nano-metal conductive layer with a double-layer passivation layer structure meets the requirement for a sheet resistance variation rate of less than 10%; and the double-layer passivation layer structure exhibited better protection ability, especially over a long time (for example, in a test of more than 240 hours).

In addition, because the nano-metal conductive layer itself has better flexibility and bending ability, the next step is to test whether the passivation layer may improve the bending ability of the metal traces of the nano-metal conductive layer. A structure including the metal trace and the passivation layer was subjected to a bending test, and the line resistance variation of the metal trace was measured. The test results are shown in Tables 2 and 3 below. Structures including a single-layer soft passivation layer, a single-layer hard passivation layer, and a double-layer passivation layer including a soft passivation layer and a hard passivation layer were tested respectively. The bending direction is the dynamic bending of the substrate relative to the direction outside the passivation layer, the bending R angle radius was 3 mm, and the bending speed was once per second.

TABLE 2

| Test conditions R = 3 mm, bending outside, 1 second/time | | | | | | |
|---|---|---|---|---|---|---|
| Passivation layer | hard passivation layer | | | soft passivation layer | | |
| Structure | hard passivation layer/metal trace/substrate | | | soft passivation layer/metal trace/substrate | | |
| Trace width | 25 µm | 30 µm | 50 µm | 25 µm | 30 µm | 50 µm |
| 10K | 0.0% | −0.3% | −0.2% | 0.1% | 0.1% | 0.1% |
| 20K | abnormal | abnormal | 1.6% | 0.2% | 0.2% | 0.1% |
| 30K | abnormal | abnormal | abnormal | 0.1% | 0.5% | 0.1% |

TABLE 2-continued

| Test conditions R = 3 mm, bending outside, 1 second/time | | | | | | |
|---|---|---|---|---|---|---|
| 120K | OL | OL | abnormal | 0.0% | 0.0% | 0.0% |
| 200K | OL | OL | abnormal | 0.2% | 0.2% | 0.1% |
| 250K | OL | OL | abnormal | 0.0% | 0.0% | −0.1% |
| 300K | OL | OL | abnormal | −0.1% | −0.1% | −0.1% |
| Bending region | Both of the metal trace and the passivation layer have cracks. | | | None of the metal trace and the passivation layer have cracks. | | |

TABLE 3

| Test conditions R = 3 mm, bending outside, 1 sec/time | | | | | | |
|---|---|---|---|---|---|---|
| Passivation layer | hard passivation layer + soft passivation layer | | | hard passivation layer + soft passivation layer | | |
| Structure | soft passivation layer/hard passivation layer/metal trace/substrate | | | hard passivation layer/soft passivation layer/metal trace/substrate | | |
| Trace width | 25 μm | 30 μm | 50 μm | 25 μm | 30 μm | 50 μm |
| 10K | 0.0% | 0.1% | 0.0% | 0.2% | 0.2% | 0.2% |
| 20K | 0.0% | 0.0% | 0.0% | 0.3% | 0.4% | 0.4% |
| 30K | 0.1% | 0.1% | 0.2% | 0.2% | 0.2% | 0.2% |
| 120K | −0.1% | −0.1% | −0.1% | 0.2% | 0.2% | 0.2% |
| 200K | −0.2% | −0.2% | −0.2% | 0.4% | 0.4% | 0.4% |
| 250K | 0.1% | 0.1% | 0.1% | 0.1% | 0.1% | 0.1% |
| 300K | −0.1% | 0.0% | 0.0% | 0.2% | 0.1% | 0.1% |
| Bending region | None of the metal trace and the passivation layer have cracks. | | | None of the metal trace and the passivation layer have cracks. | | |

It can been seen from Table 2 that the line resistance of the metal trace with a single-layer hard passivation layer disposed above was abnormal and overload (OL) after bending, and both the metal trace and the passivation layer had cracks. It can be seen from Table 3 that the line resistance of the metal trace with the double-layer passivation layer structure disposed above was not abnormal after bending. Thus, compared with a single-layer hard passivation layer, a double-layer passivation layer may significantly improve the bending ability of the metal trace.

In addition, the HTHH test was performed on the structure including the metal trace and the passivation layer, wherein the test temperature was 65° C., the humidity was 90%, and the oxidation phenomenon was observed. The test results are shown in Table 4. Structures including a single-layer soft passivation layer, a single-layer hard passivation layer, and a double-layer passivation layer including a soft passivation layer and a hard passivation layer were tested respectively.

TABLE 4

| Test conditions HTHH: 65° C., 90% | | | | |
|---|---|---|---|---|
| Structure | | | | |
| | hard passivation layer/metal trace/substrate | soft passivation layer/metal trace/substrate | soft passivation layer/hard passivation layer/metal trace/substrate | hard passivation layer/soft passivation layer/metal trace/substrate |
| 120 h | unoxidized | unoxidized | unoxidized | unoxidized |
| 240 h | partially oxidized | partially oxidized | unoxidized | unoxidized |
| 360 h | partially oxidized | partially oxidized | partially oxidized | unoxidized |
| 500 h | partially oxidized | partially oxidized | partially oxidized | unoxidized |

It can been seen from Table 4 that the metal traces with a single-layer hard passivation layer or soft passivation layer disposed above began to oxidize after 240 hours. The metal traces began to oxidize after 360 hours under the double-layer passivation layer structure in which the hard passivation layer was disposed on the metal traces before the soft passivation layer. The metal traces remained unoxidized and passed the 500 hours test under the double-layer passivation layer structure in which the soft passivation layer was disposed on the metal traces before the hard passivation layer. The double-layer passivation layer structure may provide a better anti-oxidation ability for the metal trace than a single-layer passivation layer.

It can been seen from the test results above that compared with a single-layer soft passivation layer or a single-layer hard passivation layer, the protective ability of the double-layer passivation layer structure including the hard passivation layer and the soft passivation layer on the metal traces or the nano-metal conductive layer is better. Moreover, compared with a single-layer hard passivation layer, a double-layer passivation layer structure may cause the metal traces to have better bending ability. Therefore, the configuration of a double-layer passivation layer in the touch panel may improve the bending ability and anti-oxidation ability of the device at the same time, such that the double-layer passivation layer can improve the reliability of the touch panel and extend the life of the touch panel.

The foregoing outlines features of several embodiments such that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A touch panel having a visible area and a non-visible area disposed at least on one side of the visible area, comprising:
    a substrate;
    a nano-metal conductive layer disposed on the substrate and at least in the visible area;
    a trace layer disposed on the substrate and in the non-visible area, wherein the trace layer is electrically connected to the nano-metal conductive layer;
    a first passivation layer covering the trace layer; and
    a second passivation layer covering at least a portion of the first passivation layer, wherein the first passivation layer has a different Young's modulus than the second passivation layer and the second passivation layer directly contacts a sidewall of the first passivation layer.

2. The touch panel as claimed in claim 1, wherein the first passivation layer is only disposed in the non-visible area and is directly disposed on the trace layer, and the second passivation layer is disposed in the visible area and the non-visible area.

3. The touch panel as claimed in claim 1, wherein the first passivation layer has a Young's modulus less than 1 GPa, and the second passivation layer has a Young's modulus between 2 GPa and 4 GPa; or the first passivation layer has a Young's modulus between 2 GPa and 4 GPa, and the second passivation layer has a Young's modulus less than 1 GPa.

4. The touch panel as claimed in claim 1, wherein each of the first passivation layer and the second passivation layer has a thickness less than 10 µm.

5. The touch panel as claimed in claim 1, wherein each of the first passivation layer and the second passivation layer comprises an acrylic resin, epoxy resin, polyamide, or a combination thereof.

6. A method for manufacturing a touch panel having a visible area and a non-visible area disposed at least on one side of the visible area, comprising:
    forming a nano-metal conductive layer on a substrate;
    forming a trace layer on the substrate and in the non-visible area;
    forming a first passivation layer to cover the trace layer; and
    forming a second passivation layer on the first passivation layer and covering at least a portion of the first passivation layer, wherein the first passivation layer has a different Young's modulus than the second passivation layer, wherein the second passivation layer directly contacts a sidewall of the first passivation layer.

7. The method for manufacturing a touch panel as claimed in claim 6, wherein each of forming the first passivation layer and forming the second passivation layer comprises printing, slit coating, spraying, inkjet printing, or a combination thereof.

8. The method for manufacturing a touch panel as claimed in claim 6, wherein the trace layer is formed after the nano-metal conductive layer is formed.

9. The method for manufacturing a touch panel as claimed in claim 6, wherein the trace layer is formed before the nano-metal conductive layer is formed.

10. The method for manufacturing a touch panel as claimed in claim 6, wherein the first passivation layer is only formed in the non-visible area and is directly formed on the trace layer, and the second passivation layer is formed in the visible area and the non-visible area.

11. The method for manufacturing a touch panel as claimed in claim 6, wherein the first passivation layer has a Young's modulus less than 1 GPa, and the second passivation layer has a Young's modulus between 2 GPa and 4 GPa; or the first passivation layer has a Young's modulus between 2 GPa and 4 GPa, and the second passivation layer has a Young's modulus less than 1 GPa.

12. A touch panel having a visible area and a non-visible area disposed at least on one side of the visible area, comprising:
    a substrate;
    a nano-metal conductive layer disposed on the substrate and at least in the visible area;
    a trace layer disposed on the substrate and in the non-visible area, wherein the trace layer is electrically connected to the nano-metal conductive layer;
    a first passivation layer covering the trace layer; and
    a second passivation layer covering at least a portion of the first passivation layer, wherein:
        the first passivation layer directly contacts a top surface of the trace layer, and
        the second passivation layer directly contacts a sidewall of the trace layer.

13. The touch panel as claimed in claim 12, wherein the first passivation layer has a different Young's modulus than the second passivation layer.

14. The touch panel as claimed in claim 12, wherein the second passivation layer directly contacts a sidewall of the first passivation layer.

15. The touch panel as claimed in claim 14, wherein the second passivation layer directly contacts a top surface of the first passivation layer.

16. The touch panel as claimed in claim 12, wherein the first passivation layer has a Young's modulus less than 1 GPa, and the second passivation layer has a Young's modulus between 2 GPa and 4 GPa; or the first passivation layer has a Young's modulus between 2 GPa and 4 GPa, and the second passivation layer has a Young's modulus less than 1 GPa.

* * * * *